United States Patent Office 3,313,799
Patented Apr. 11, 1967

3,313,799
WATER-SOLUBLE DISAZO-DYESTUFFS
Walter Noll, Bad Soden, Taunus, Germany, assignor to Farbwerke Hoechst Aktiengesellschaft vormals Meister Lucius & Bruning, Frankfurt am Main, Germany, a corporation of Germany
No Drawing. Filed Oct. 15, 1963, Ser. No. 316,432
Claims priority, application Germany, Oct. 19, 1962, F 38,093
6 Claims. (Cl. 260—160)

The present invention relates to new, very easily water-soluble disazo-dyestuffs and to a process for preparing them; more particularly it relates to disazo-dyestuffs of the general formula (1)

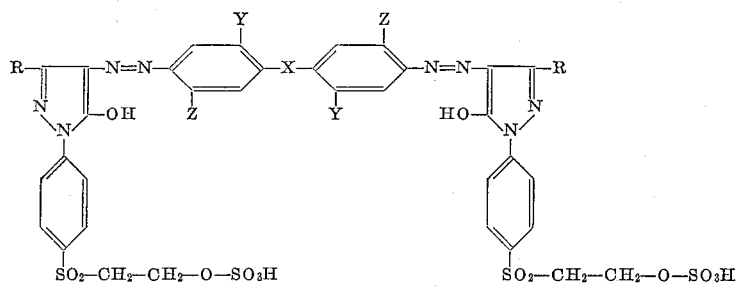

in which X represents a direct linkage or one of the groupings —O—, —S—, —SO$_2$— and —CH=CH— as a bridge member, Z represents a hydrogen atom or an alkyl or alkoxy group, Y represents a sulfonic acid or carboxylic acid group, and R represents a methyl, carboxylic acid or carboxylic acid ester group.

It has been found, that new, valuable, very easily water-soluble disazo-dyestuffs of the general formula (1)

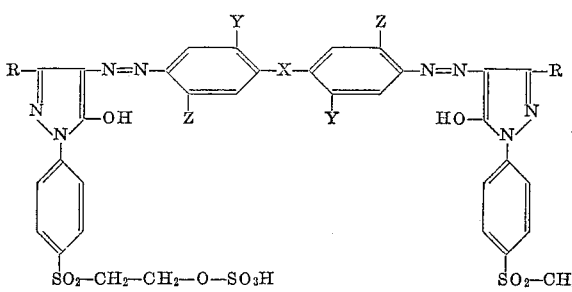

in which X represents a direct linkage or one of the groupings —O—, —S—, —SO$_2$— and —CH=CH— as a bridge member, Z represents a hydrogen atom or a lower alkyl or lower alkoxy group, Y represents a sulfonic acid or carboxylic acid group, and R represents a methyl, carboxylic acid or lower alkoxy carbonyl, can be prepared by coupling tetrazotized amines of the general formula (2)

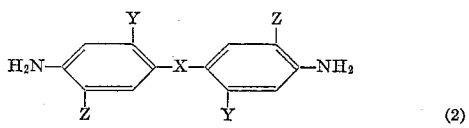

in which X, Y and Z have the meanings given above, with pyrazolone derivatives of the general formula (3)

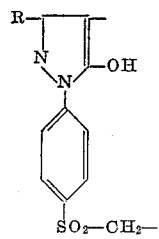

in which R has the meaning given above and R' represents a hydrogen atom or the sulfonic acid group, and by esterifying the disazo-dyestuff so obtained with sulfuric acid if R' represents a hydrogen atom.

Suitable amines of the aforementioned general formula (2) are for example:

4,4'-diaminodiphenyl-2,2'-disulfonic acid,
4,4'-diaminodiphenyl-2,2'-dicarboxylic acid,
4,4'-diamino-3,3'-dimethyl-diphenyl-6,6'-disulfonic acid,
4,4'-diamino-3,3'-dimethoxydiphenyl-6,6'-disulfonic acid,
4,4'-diaminodiphenyl-ether-2,2'-disulfonic acid,
4,4'-diaminodiphenylsulfide-2,2'-disulfonic acid,
4,4'-diaminodiphenyl-sulfone-2,2'-disulfonic acid,
4,4'-diaminostilbene-2,2'-disulfonic acid.

As suitable azo components there may be mentioned for example:

3-methyl-1-(4'-β-hydroxyethyl-sulfonylphenyl)-pyrazolone-(5),
1-(4'-β-hydroxyethyl-sulfonylphenyl)-pyrazolone-(5)-3-carboxylic acid,
1-(4'-β-hydroxyethyl-sulfonylphenyl)-pyrazolone-(5)-3-carboxylic acid ethyl ester
and the sulfuric acid esters of the aforementioned three pyrazolone derivatives.

The new dyestuffs prepared according to the present invention, which are isolated in the form of alkali metal salts, preferably sodium or potassium salts and which are obtained with a very good yield, are very readily soluble in water. They are suitable for dyeing and printing various fibrous materials, for example, wool, silk, polyamides, in particular polyhydroxylated fibrous materials, such as regenerated or natural cellulose, for example cellulose, linen and cotton. The new dyestuffs are particularly suitable for the dyeing in a long bath. They are fixed by treating the fibrous material before, during or after the application of the dyestuffs by means of alkaline agents, such as sodium acetate, sodium bicarbonate, sodium carbonate, potassium carbonate, potassium bicarbonate sodium hydroxide solution or trisodium phosphate.

The dyeings and prints obtained with the novel dyestuffs are distinguished by a very good fastness to wet processing, by their brilliant shades and a good to very good fastness to light.

The following examples serve to illustrate the invention, but they are not intended to limit it thereto, the parts being by weight unless otherwise stated and the relationship of parts by weight to parts by volume being the same as that of the kilogram to the liter.

Example 1

17.2 parts of 4,4'-diaminodiphenyl-2,2'-disulfonic acid are neutralized and dissolved in 50 parts by volume of water with 50 parts by volume of 2 N-sodium hydroxide solution. This solution is mixed with 20 parts by volume of 5 N-sodium nitrite solution and introduced into a mixture of 150 parts by volume of 2 N-hydrochloric acid and 100 parts of ice while stirring.

When the diazotization is complete the excess nitrite is removed by the addition of amidosulfonic acid.

28.2 parts of 3-methyl-1-(4'-β-hydroxyethyl-sulfonylphenyl)-pyrazolone-(5) are introduced into 125 parts of concentrated sulfuric acid and stirred overnight. The solution thus obtained is stirred on 500 parts of ice and adjusted to a pH-value of 4 by adding 120 parts of sodium carbonate. The solution obtained is then added to the tetrazo solution prepared as described above and the pH-value is adjusted to 6–7 by adding sodium carbonate solution of 10% strength. When the coupling is complete, the dyestuff is precipitated by means of potassium chloride, filtered and dried at 50° to 60° C. There is obtained a brown-yellow powder which dissolves readily in water to give a yellow solution.

The dyestuff dyes cotton in a long bath in the presence of acid-binding agents, such as sodium bicarbonate, sodium carbonate or trisodium phosphate, in intense yellow shades with a very good fastness to light and washing.

Example 2

31.2 parts of 1-(4'-β-hydroxyethyl-sulfonylphenyl)-pyrazolone-(5)-3-carboxylic acid are introduced at room temperature in 125 parts of concentrated sulfuric acid and esterified overnight at room temperature. The solution obtained is poured on 500 parts of ice, and the pH-value is adjusted to 4 by the addition of 130 parts of sodium carbonate. The solution is then added to the tetrazo solution prepared according to the method described in Example 1 and neutralized with sodium carbonate solution to a pH-value of 6–7. Stirring is continued until the coupling is complete, the dyestuff is then precipitated by means of potassium chloride, filtered off, washed and dried. The so obtained dyestuff is an orange powder which dissolves readily in water to given an orange-yellow solution.

When dyeing cotton or regenerated cellulose in a long bath in the presence of acid-binding agents, with the aforementioned dyestuff, intense yellow dyeings are obtained possessing a very good fastness to wet processing.

Example 3

17.2 parts of 4,4'-diaminodiphenyl-2,2'-disulfonic acid are diazotized as described in Example 1. To the tetrazo solution obtained there is added the solution of 28.2 parts of 3-methyl-1-(4'-β-hydroxyethyl-sulfonylphenyl)-pyrazolone-(5) in 100 parts by volume of water and 55 parts by volume of 2 N-sodium hydroxide solution and the pH-value is then adjusted to 7–8 by adding a sodium carbonate solution. When the coupling is complete, the disazo dyestuff is precipitated by means of sodium chloride, isolated by filtering and washed with a sodium sulfate solution of 10% strength. After drying, the pulverized dyestuff is introduced at room temperature in 400 parts by volume of concentrated sulfuric acid and stirred overnight. The so obtained solution is poured on 1500 parts of ice and neutralized with about 400 parts of sodium carbonate until the pH-value 5 is attained. The dyestuff which has been esterified with sulfuric acid is precipitated by means of potassium chloride, isolated and dried at 50° C. to 60° C. There is obtained the same dyestuff as described in Example 1.

When replacing the 28.2 parts of 3-methyl-1-(4'-β-hydroxyethyl - sulfonylphenyl) - pyrazolone-(5) by 31.2 parts of 1-(4'-β-hydroxyethyl-sulfonylphenyl)-pyrazolone-(5)-3-carboxylic acid, there is obtained the same dyestuff as described in Example 2.

The following table shows further disazo dyestuffs which can be prepared in an analogous manner; it also exhibits the tints which are obtained when dyeing cotton with those disazo dyestuffs:

| Tetrazo component | Azo component | Tint on cotton |
|---|---|---|
| H₂N—C₆H₂(SO₃H)(CH₃)—C₆H₂(CH₃)(SO₃H)—NH₂ | H₃C-pyrazolone-OH, N-phenyl-SO₂—CH₂—CH₂—O—SO₃H | Yellow. |
| H₂N—C₆H₂(SO₃H)(OCH₃)—C₆H₂(OCH₃)(SO₃H)—NH₂ | H₃C-pyrazolone-OH, N-phenyl-SO₂—CH₂—CH₂—O—SO₃H | Golden-yellow. |

| Tetrazo component | Azo component | Tint on cotton |
|---|---|---|
| 4,4'-diamino-2,2'-dicarboxybiphenyl (H$_2$N–C$_6$H$_3$(COOH)–C$_6$H$_3$(COOH)–NH$_2$) | 3-methyl-1-[4-(β-sulfatoethylsulfonyl)phenyl]-5-hydroxypyrazole | Yellow. |
| bis(4-amino-2-sulfophenyl) ether | 3-methyl-1-[4-(β-sulfatoethylsulfonyl)phenyl]-5-hydroxypyrazole | Do. |
| bis(4-amino-2-sulfophenyl) sulfide | 3-methyl-1-[4-(β-sulfatoethylsulfonyl)phenyl]-5-hydroxypyrazole | Orange. |
| bis(4-amino-2-sulfophenyl) sulfone | 3-methyl-1-[4-(β-sulfatoethylsulfonyl)phenyl]-5-hydroxypyrazole | Yellow. |
| 4,4'-diamino-2,2'-disulfostilbene | 3-methyl-1-[4-(β-sulfatoethylsulfonyl)phenyl]-5-hydroxypyrazole | Red-orange. |
| 4,4'-diamino-3,3'-dimethyl-2,2'(or 6,6')-disulfobiphenyl | 3-carboxy-1-[4-(β-sulfatoethylsulfonyl)phenyl]-5-hydroxypyrazole | Yellow. |
| 4,4'-diamino-3,3'-dimethoxy-2,2'(or 6,6')-disulfobiphenyl | 3-carboxy-1-[4-(β-sulfatoethylsulfonyl)phenyl]-5-hydroxypyrazole | Golden-yellow. |

| Tetrazo component | Azo component | Tint on cotton |
|---|---|---|
| $H_2N$–C₆H₃(COOH)–C₆H₃(COOH)–$NH_2$ (4,4'-diamino-2,2'-dicarboxybiphenyl) | HOOC–pyrazol–OH with N–C₆H₄–$SO_2$–$CH_2$–$CH_2$–O–$SO_3H$ | Yellow. |
| $H_2N$–C₆H₃($SO_3H$)–O–C₆H₃($SO_3H$)–$NH_2$ | HOOC–pyrazol–OH with N–C₆H₄–$SO_2$–$CH_2$–$CH_2$–O–$SO_3H$ | Do. |
| $H_2N$–C₆H₃($SO_3H$)–S–C₆H₃($SO_3H$)–$NH_2$ | HOOC–pyrazol–OH with N–C₆H₄–$SO_2$–$CH_2$–$CH_2$–O–$SO_3H$ | Orange. |
| $H_2N$–C₆H₃($SO_3H$)–$SO_2$–C₆H₃($SO_3H$)–$NH_2$ | HOOC–pyrazol–OH with N–C₆H₄–$SO_2$–$CH_2$–$CH_2$–O–$SO_3H$ | Yellow. |
| $H_2N$–C₆H₃($SO_3H$)–CH=CH–C₆H₃($SO_3H$)–$NH_2$ | HOOC–pyrazol–OH with N–C₆H₄–$SO_2$–$CH_2$–$CH_2$–O–$SO_3H$ | Red-orange. |
| $H_2N$–C₆H₂($SO_3H$)($CH_3$)–C₆H₂($CH_3$)($SO_3H$)–$NH_2$ | $H_5C_2$–OOC–pyrazol–OH with N–C₆H₄–$SO_2$–$CH_2$–$CH_2$–O–$SO_3H$ | Yellow. |

We claim:
1. The water-soluble disazodyestuffs having the formula

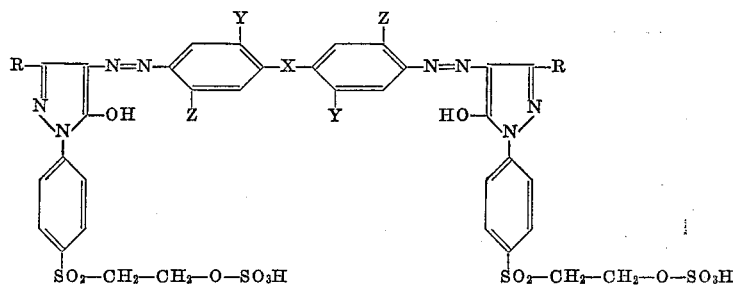

in which X represents a member of the group consisting of direct linkage, —O—, —S—, —SO$_2$— and —CH=CH—, Z represents a member of the group consisting of hydrogen, lower alkyl and lower alkoxy, Y represents a member of the group consisting of —SO$_3$H and —COOH, and R represents a member of the group consisting of methyl, carboxyl and lower alkoxy carbonyl group.

2. The water-soluble disazodyestuff having the formula

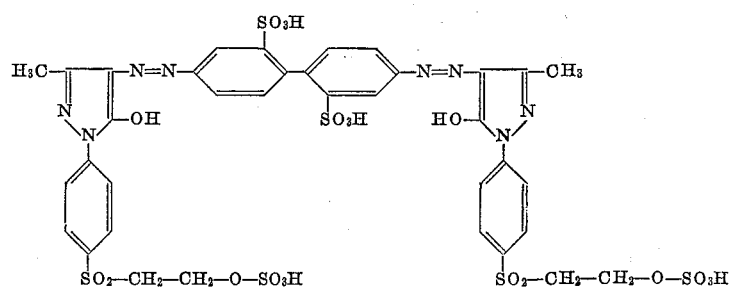

3. The water-soluble disazodyestuff having the formula

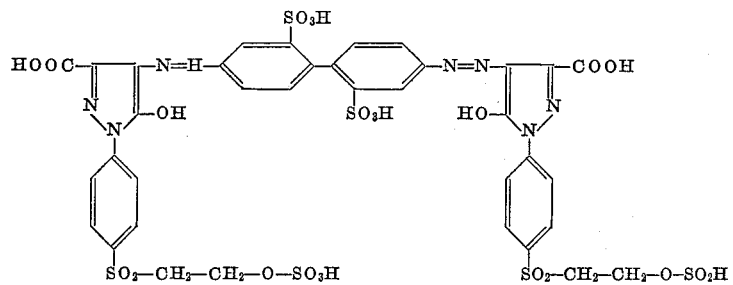

4. The water-soluble disazodyestuff having the formula

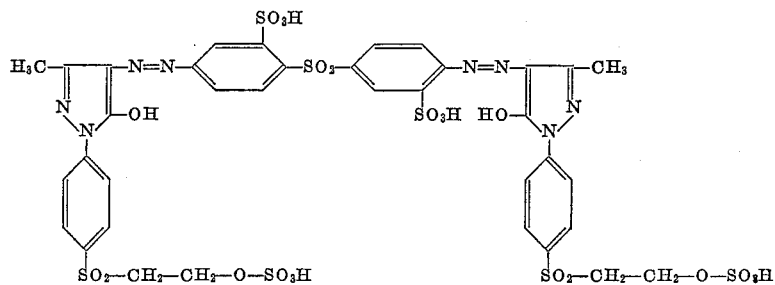

5. The water-soluble disazodyestuff having the formula

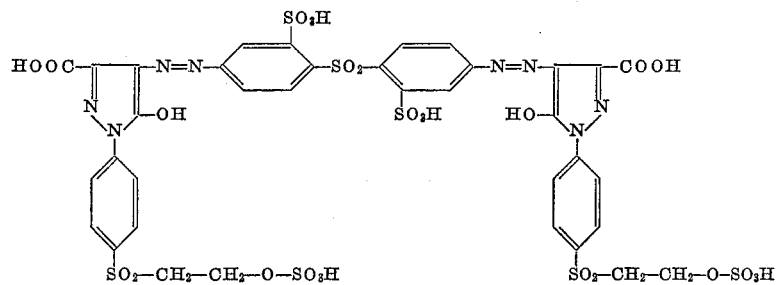

6. The water-soluble disazodyestuff having the formula
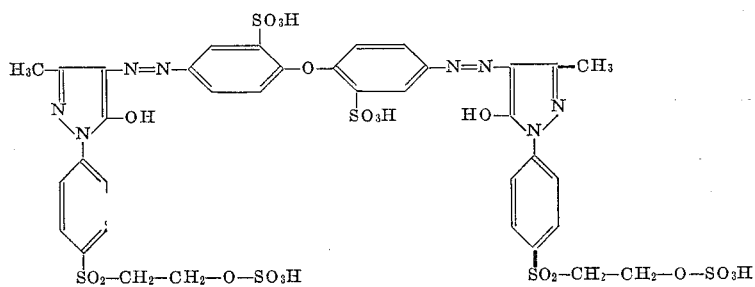
References Cited by the Examiner
UNITED STATES PATENTS
| | | | |
|---|---|---|---|
| 791,524 | 6/1905 | Witter | 260—161 |
| 936,367 | 10/1909 | Schedler | 260—160 |
| 2,670,265 | 2/1954 | Heyna et al. | 260—160 X |
| 2,728,762 | 12/1955 | Heyna et al. | 260—195 X |
FOREIGN PATENTS
| | | |
|---|---|---|
| 175,217 | 9/1906 | Germany. |
CHARLES B. PARKER, *Primary Examiner.*
R. J. FINNEGAN, F. D. HIGEL, *Assistant Examiners.*